United States Patent [19]
Barrett

[11] Patent Number: 5,087,491
[45] Date of Patent: Feb. 11, 1992

[54] VIBRATION-DAMPING STRUCTURAL MEMBER

[75] Inventor: David J. Barrett, Erdenheim, Pa.

[73] Assignee: The United States of America as represented by the Secretary of the Navy, Washington, D.C.

[21] Appl. No.: 479,004

[22] Filed: Feb. 9, 1990

[51] Int. Cl.⁵ .................. F16C 27/06; F16C 1/40; B32B 15/08
[52] U.S. Cl. ................... 428/34.5; 428/218; 428/220; 428/411.1; 428/414; 428/415; 428/408; 428/511; 248/560; 248/636; 248/638
[58] Field of Search ............ 428/411.1, 414, 415, 428/906, 408, 34.5, 218, 220

[56] References Cited
U.S. PATENT DOCUMENTS

| | | |
|---|---|---|
| 4,079,926 | 3/1978 | Nunes . |
| 4,278,726 | 7/1981 | Wieme . |
| 4,447,493 | 4/1984 | Driscoll et al. . |
| 4,728,831 | 3/1988 | Cheng . |
| 4,740,427 | 4/1988 | Ochiumi et al. . |
| 4,778,028 | 10/1988 | Staley . |
| 4,822,834 | 4/1989 | Blevins . |

*Primary Examiner*—P. C. Sluby
*Attorney, Agent, or Firm*—James V. Tura; James B. Bechtel; Susan E. Verona

[57] ABSTRACT

A structural element or member is disclosed that resists or damps vibration from loads applied along a given axis without significantly sacrificing stiffness, through the use of stress coupling within an anisotropic material. Essentially, the structural member comprises alternating layers or laminates of stiff and viscoelastic or damping material bonded together to form a laminated structrue. The laminated structural member is oriented to receive the applied load in a direction that is parallel to the laminates. At least one of the stiff laminates shows anisotropic behavior when acted upon by the axial load, causing shear strain and concomitant transverse displacement therewithin, thereby loading the viscoelastic laminate in shear.

4 Claims, 1 Drawing Sheet

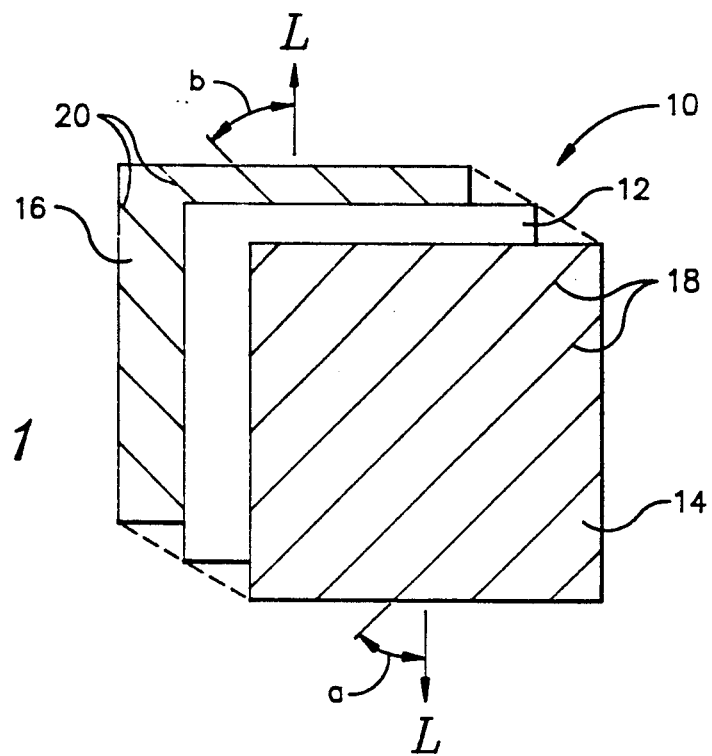
*Fig. 1*
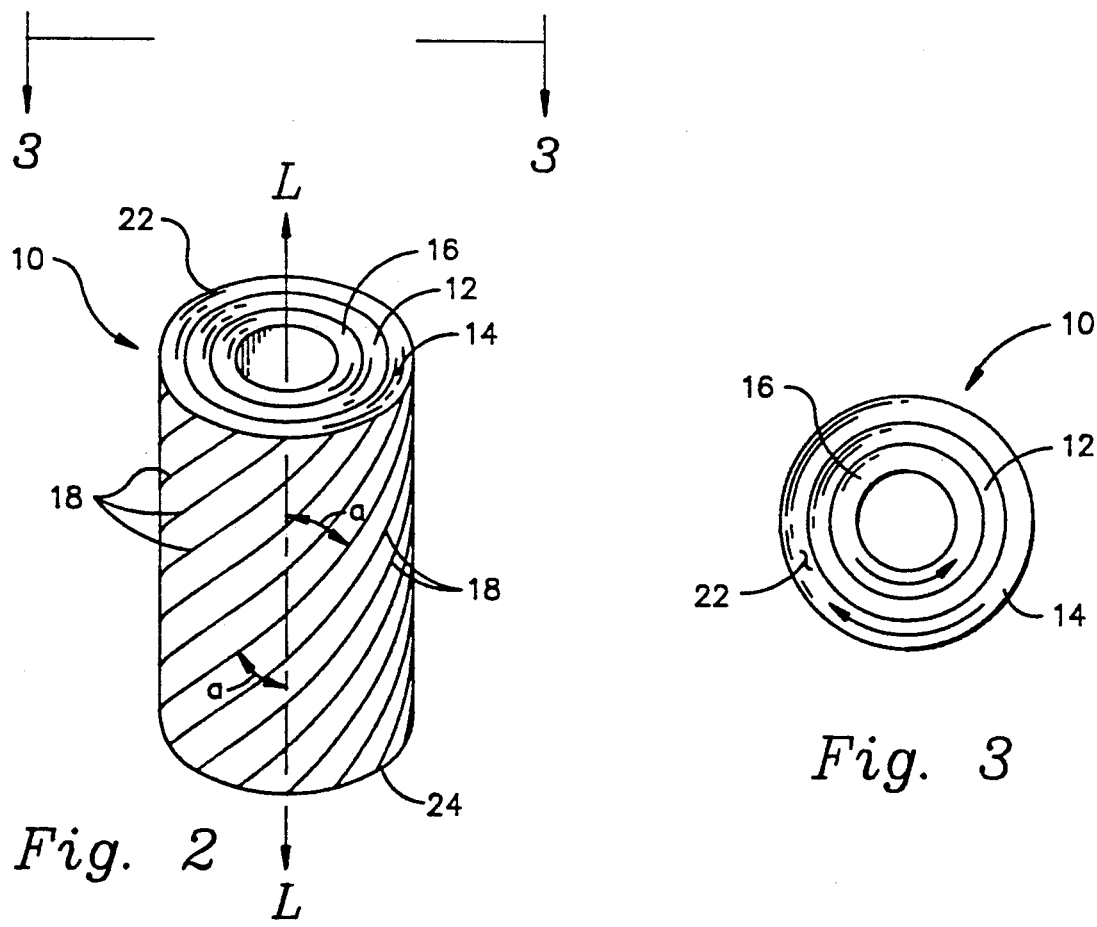
*Fig. 2*
*Fig. 3*

VIBRATION-DAMPING STRUCTURAL MEMBER

STATEMENT OF GOVERNMENT INTEREST

The invention described herein may be manufactured and used by and for the Government of the United States of America for governmental purposes without the payment of any royalties thereon or therefor.

BACKGROUND OF THE INVENTION

The present invention relates generally to load-bearing elements or structural members and more particularly to such elements or members which exhibit damping characteristics when subjected to vibrations from axial loads.

Vibrations are incurred in the normal use of various load-bearing systems and structures which cause them to suffer from high cycle and resonant fatigue and reduced service life. Constrained-layer damping treatments are commonly used to reduce the vibration in many of these structures. In most applications the treatment is designed to damp flexural modes of vibration. A layer of viscoelastic damping material is bonded between a base member and a constraining cover layer of stiff structural material. When this sandwiched structure bends, the constrained damping layer bears a portion of that load directly and deforms, absorbing vibrational energy.

Some elements are subject to axial, as opposed to flexural, vibrations. Examples include the support elements of trusses, posts and equipment supports for aircraft, the struts of landing gear, and the structural members of machinery, transport equipment and naval vessels.

For damping axial or tension/compression loads, two composite constructions are commonly employed, both of which involve a trade-off between stiffness and damping. They comprise a combination of stiff and viscoelastic materials either in series or in parallel. In a series arrangement the axial load is born fully by both the stiff and viscoelastic materials, providing good damping but poor stiffness. In a parallel arrangement the two materials share the axial load, with the stiff material supporting the bulk of it. This provides good stiffness, but the viscoelastic material is not sufficiently loaded to provide significant damping.

SUMMARY OF THE INVENTION

It is therefore an object of the present invention to provide a load-bearing member which damps axial loads.

It is another object to provide a damping means for axial loads which does not significantly sacrifice stiffness.

Briefly, these and other objects of the invention are accomplished by a structural element or member that resists or damps vibration from loads applied along a given axis without significantly sacrificing stiffness, through the use of stress coupling within an anisotropic material. Essentially, the structural element comprises alternating layers or laminates of stiff and viscoelastic or damping material bonded together to form a laminated structure. The laminated structural member is oriented to receive the applied load in a direction that is parallel to the laminates. At least one of the stiff laminates shows anisotropic behavior when acted upon by the axial load, causing shear strain and concomitant transverse displacement therewithin, thereby loading the viscoelastic laminate in shear.

These and other objects, advantages, and novel features of the invention will become apparent from the following detailed description of the invention when considered in conjunction with the accompanying drawings.

BRIEF DESCRIPTION OF THE DRAWINGS

FIG. 1 is an expanded diagrammatic view of the structural member of the present invention;

FIG. 2 is a view of one embodiment of the structural member of the present invention; and FIG. 3 is a view of the structural member shown in FIG. 2 taken along the line 3—3, showing the cross-section thereof.

DESCRIPTION OF THE PREFERRED EMBODIMENT

The present invention provides a structural element or member that resists or damps vibration from loads applied along a given axis without significantly sacrificing stiffness, through the use of stress coupling within an anisotropic material. Essentially, the structural member comprises alternating layers or laminates of stiff or load-bearing and viscoelastic or damping material bonded together to form a laminated structure. The laminated structural member is oriented to receive the applied load in a direction that is parallel to the laminates. At least one of the stiff laminates shows anisotropic behavior when acted upon by the axial load, causing shear strain and concomitant transverse displacement therewithin, thereby loading the viscoelastic laminate in shear. The dissipation of vibrational energy is brought about by the innate ability of viscoelastic materials to convert strain energy into heat. In a preferred embodiment, the structural member comprises concentric cylindrical layers of stiff and viscoelastic materials. The structural member can be used in the form of rods, tubes, columns, posts, struts, cables, truss elements and tension-compression members.

Referring now to the drawings wherein like characters designate like or corresponding parts throughout the several views, there is shown in FIG. 1 a diagrammatic view of a structural member 10 of the present invention. A laminate 12 of viscoelastic material is bonded on one side thereof to a first laminate 14 of stiff material and on the other side thereof to a second laminate 16 of stiff material (the laminates are shown detached to illustrate their relative relationship).

The selection of a particular viscoelastic material for use as laminate 12 is based on standard design considerations known to those skilled in the art such as damping capacity and useful temperature and frequency ranges. Examples of appropriate viscoelastic materials are adhesives, elastomers, polymerics, epoxies and thermoplastics. An anchoring layer may be incorporated as part of viscoelastic laminate 12 for improved bonding to stiff laminates 14 and 16.

Laminates 12, 14, and 16 are oriented to be parallel to the axis or direction of a given applied load L, which may be either tensile or compressive. First stiff laminate 14 is of a material which will behave anisotropically when stress-loaded along the axis of the given applied load L, meaning that stress coupling will occur within the stiff laminate when the load is applied and shear strains will be created therein. The material may be inherently anisotropic or it may be an orthotropic material, one that has a preferred orientation of stiffness, configured to behave anisotropically under the given applied load L. For instance, an orthotropic material will behave anisotropically when positioned with its axis of preferred orientation at an angle with respect to applied load L. The orthotropy may be an inherent characteristic of the stiff material, such as with wood, or it may be a built-in design characteristic, such as with fiber-reinforced materials like graphite/epoxy, glass/epoxy, and kevlar/epoxy. Orthotropy may be provided in the form of discontinuous fiber- or particulate-reinforced material such as silicon/titanium and oriented chopped fiber materials. Normally isotropic materials such as steel and aluminum can be made to behave anisotropically by treatments such as surface waffling, spiral stiffening, surface scoring, and cut-outs. The choice of the specific stiff material to be used will be based on the amount of stiffness required by the application and the magnitude of the load, as well as other standard design considerations known to those skilled in the art. The appropriate thicknesses of each of laminates 12, 14, and 16 are also determined according to standard design considerations known to those skilled in the art.

Lines 18 represent schematically the orthotropic character of first stiff laminate 14 and show its preferred orientation. Angle a is the angle between load L and the preferred orientation and may be any angle greater than 0 degrees and less than 90 degrees, preferably within the range of from 5 to 15 degrees. The stiffness of member 10 is reduced as the value of angle a increases. Preferably, as shown in FIG. 1, second stiff laminate 16 behaves anisotropically, as by being orthotropic and having its preferred axis (represented schematically by lines 20) oriented at an angle b with respect to load L. Angle b is in the opposite direction with respect to load L as is angle a.

FIGS. 2 and 3 show a preferred embodiment of structural member 10 formed into a cylindrical shape, laminates 12, 14, and 16 forming concentric layers therein, with first stiff laminate 14 being the outermost of the layers. Lines 18 now form helices about the cylinder of structural member 10. Likewise, lines 20 (not shown in FIGS. 2 and 3) form helices in second stiff laminate 16, but are oriented in the opposite direction as lines 18.

In operation, structural member 10 is subjected to given axial load L in either tension or compression (shown in tension). Of course, load L may oscillate rapidly between tension and compression. Due to the anisotropic behavior of first stiff laminate 14, it will want to dislocate transversely to applied load L, causing it to move transversely relative to second stiff laminate 16. Since both stiff laminates 14 and 16 are bonded to viscoelastic laminate 12, this loads the viscoelastic laminate in shear, allowing damping of oscillation of applied load L. The greater the relative displacement, the greater the amount of shear imparted to viscoelastic laminate 12. If stiff laminate 16 is also anisotropic but is oriented in the opposite direction, as shown in FIG. 1, the relative displacement of the stiff laminates to each other is greater. The total relative displacement can also be varied by varying angle a. The closer to 45 degrees angle a is, the greater the relative displacement of stiff laminates 14 and 16 with respect to each other, maximizing damping but sacrificing stiffness.

In the case of the cylindrically shaped structural member 10 shown in FIG. 2, the transverse displacement is around the circumference of the cylinder, which manifests itself as a twisting of the cylinder, the top end 22 thereof displacing in one relative transverse direction and the bottom end 24 thereof displacing in the opposite relative transverse direction. FIG. 3 shows a cross-sectional view of cylindrical structural member 10 of FIG. 2 viewed from line 3—3. It illustrates the relative displacement of laminates 14 and 16 near top 22 with respect to each other when loaded in tension. When viewed from the same perspective, the direction of displacement of laminates 14 and 16 near bottom 24 is opposite to that near top 22. When loaded in compression (not shown), the cylinder will twist in the opposite direction from that shown in FIG. 3. Of course if the preferred orientation of the orthotropic materials of stiff laminates 14 and 16 were reversed the twist of the cylinder would be in the opposite direction.

The vibrations or oscillations of structural member 10 are damped by viscoelastic laminate 12 which sees only the shear load imparted to it by stiff laminates 14 and 16. In contrast, stiff laminates 14 and 16 are bearing all of axial load L. In this way maximum use is made of the damping capability of the viscoelastic material by loading it in shear, without suffering the accompanying large sacrifice in stiffness experienced with a serial approach to damping axial loads.

The bonded laminates 12, 14, and 16 may be configured into structural members 10 having other shapes as well, providing the relationship of the laminates to each other and their orientation in relation to applied load L is like that shown in FIG. 1. For instance, the bonded laminates may be formed into an elongated structure similar to a cylinder, having coaxial layers corresponding to laminates 12, 14, and 16, but having a cross-section other than a circle, such as a square. In this case the displacement of anisotropic first stiff laminate 14 is around the square cross-sectional perimeter of the elongated structure. Otherwise the principle of operation remains the same, with first stiff laminate 14 moving transversely relative to second stiff laminate 16, loading viscoelastic laminate 12 in shear.

Although cylindrical structural member 10 as shown in FIGS. 2 and 3 is hollow, the cylindrical space along the center axis thereof may be filled in, if desired.

Of course, more layers may be employed than just three. Laminated structural member 10 may comprise several alternating laminates of stiff and viscoelastic material bonded together. Each successive outer stiff laminate would then rotate in a direction opposite to the previous one, thus shearing the viscoelastic layer therebetween. It may be advantageous in such an embodiment to use different viscoelastic materials for each viscoelastic laminate, the different materials each having a different peak range of certain desirable properties such as temperature and frequency tolerance. In this way one can increase the range of useful applications of structural member 10. The various laminates of stiff material may be composed of different materials as well. For instance, the inner stiff laminates of a cylindrical structural member 10 may be selected for strength and the outer stiff laminate for corrosion inhibition.

Circumferential or perimetric displacements that occur at ends 22 and 24 of structural member 10 due to twisting can be reduced through the use of higher modulus viscoelastic materials. Alternatively, the circumferential or perimetric displacements, which are necessary for shearing the viscoelastic laminate or laminates, could be confined to the portion between ends 22 and 24 of member 10, leaving the ends stationary. Such an effect can be achieved through variable axial stiffness such as by the use of stepped thicknesses or variably angled fibers or filaments in an anisotropically designed stiff laminate. The fibers or filaments of such an anisotropic laminate would be oriented to be in parallel with load L at ends 22 and 24 of structural member 10 (angle a=0) and oriented off-axis with load L (angle a is between 0 and 90 degrees) between the ends.

Other variations in design for optimizing desirable properties are possible. For instance, viscoelastic laminate 12 may be discontinuous either along the length of structural member 10 or around the perimeter thereof when the member has coaxial layers. In such arrangements viscoelastic laminate 12 would be placed only in areas of maximum relative displacement of stiff laminates 14 and 16.

A three-laminate cylindrical embodiment of structural member 10 may be made in the following manner. Second stiff laminate 16 of an orthotropic material having a thickness of 0.0699 cm is first wrapped around a cylindrical mandrel with the preferred stiffness axis thereof oriented at the chosen angle b (for example 5 to 15 degrees) with respect to the axis of the mandrel. The orthotropic material may be uncured graphite epoxy having an axial modulus of 128 GPa and a transverse modulus of 11 GPa. Cylindrical first stiff laminate 16 is then cured and the mandrel is removed. Viscoelastic laminate 12 is then applied in one of various known ways to the outer perimeter of stiff laminate 16 to provide a 0.0127 cm thick laminate. The viscoelastic material may have, for example, a shear modulus of 0.024 GPa and a loss factor of 1. First stiff laminate 14 of the same orthotropic material as laminate 16 and having a thickness of 0.0254 cm is then applied to viscoelastic laminate 12 with its preferred axis at chosen angle a (for example 5 to 15 degrees) with respect to the axis of cylindrical laminates 12 and 16. The resulting cylindrical structure, having a diameter of 5.08 cm, is then cured and cut to a length of 25.4 cm. Such an embodiment of structural member 10 could be used as a support for a load L of 232 Kg and would have damping properties 30% better than conventional stiffness-only supports.

Some of the many advantages and novel features of the invention should now be readily apparent. For instance, a load-bearing structural member has been provided which damps axial loads without significantly sacrificing stiffness. This load-bearing member can be used in trusses to reduce the settling time following a movement or repositioning of the truss. Structures which incorporate the invention will benefit from a reduction in high cycle and resonant fatigue and will experience increased operational envelopes and lengthened service life. In aircraft and rotorcraft it could be employed in posts, equipment supports, special duty support work and the struts of landing gear. In spacecraft, it could be used as a basic component in lattice structure and sensor supports. Avionics could employ the invention in electronic chassis, antennae structure and in components subjected to high noise environments. Other applications include the structural members of machinery, transport equipment, and naval vessels. An additional advantage of the invention is its resistance to all modes of vibration. For flexural modes viscoelastic laminate 12 will be sheared by the displacements that occur in beam bending. Torsional modes, through stress coupling will result in the shearing of viscoelastic laminate 12 through differential axial displacements.

Other embodiments and modifications of the present invention may readily come to those of ordinary skill in the art having the benefit of the teachings presented in the foregoing description and drawings. Therefore, it is to be understood that the present invention is not to be limited to such teachings presented, and that such further embodiments and modifications are intended to be included within the scope of the appended claims.

What is claimed is:

1. A laminated structural member in the shape of a cylinder which supports axial loads which are colinear with the cylinder's axis and damps vibrations therefrom, comprising at least one cylindrical layer of viscoelastic material bonded on the outside thereof to a first cylindrical layer of orthotropic load-bearing material and on the inside thereof to a second cylindrical layer of orthotropic load-bearing material, said first orthotropic load-bearing layer having its preferred direction of stiffness at a first angle with respect to the cylinder's axis and said second orthotropic load-bearing layer having its preferred direction of stiffness at a second opposite angle with respect to the cylinder's axis, whereby the axial load causes said first and second load-bearing layers to displace circumferentially and in opposite relative directions, thereby shearing said viscoelastic layer in a direction transverse to the axial load.

2. The laminated structural member of claim 1 wherein said viscoelastic material is an adhesive.

3. The laminated structural member of claim 1 wherein said orthotropic load-bearing material is graphite/epoxy.

4. The laminated structural member of claim 1, further comprising a plurality of additional cylindrical layers of alternately viscoelastic and orthotropic load-bearing material bonded to the outside of said first cylindrical layer of orthotropic load-bearing material, each successive outer additional orthotropic load-bearing layer having its preferred direction of stiffness at an opposite angle with respect to the cylinder's axis as the previous orthotropic layer.

* * * * *